UNITED STATES PATENT OFFICE.

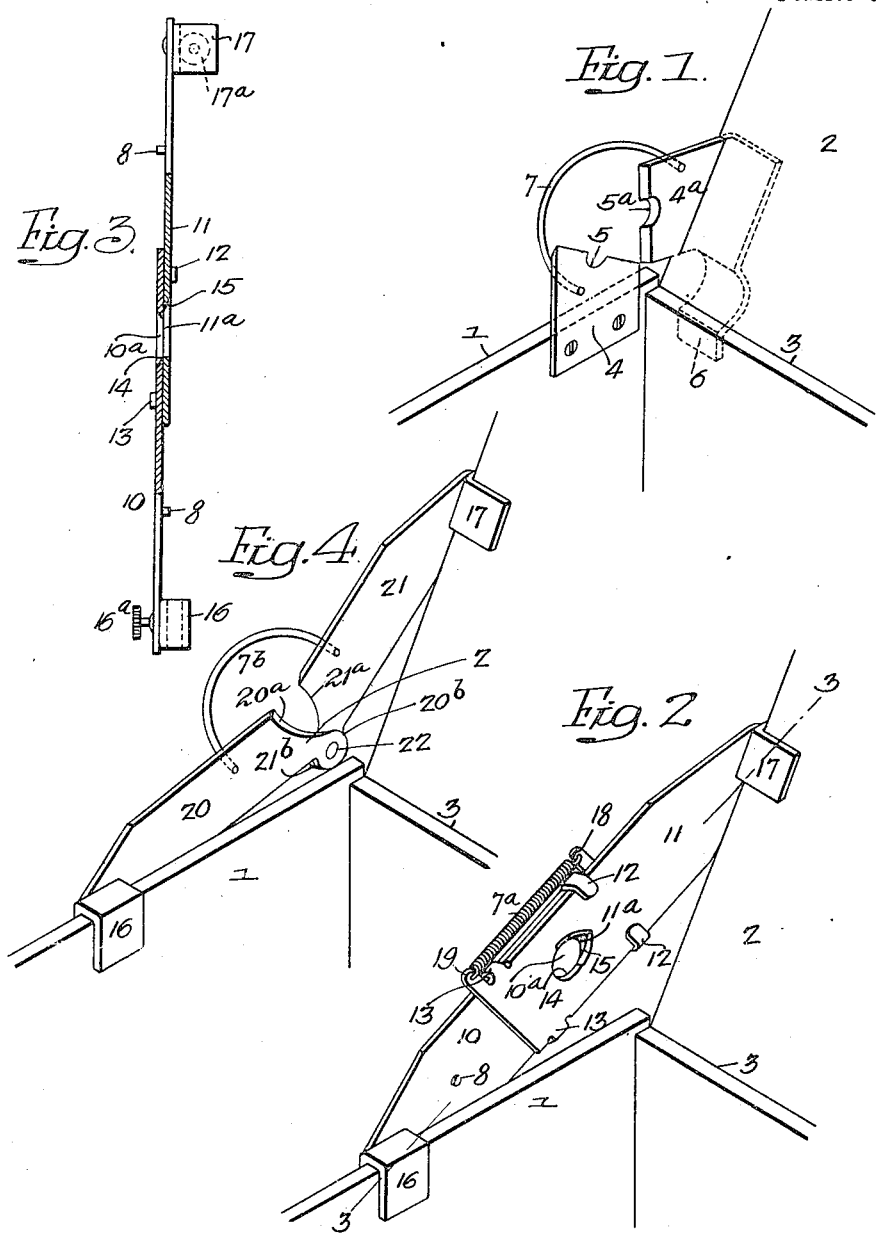

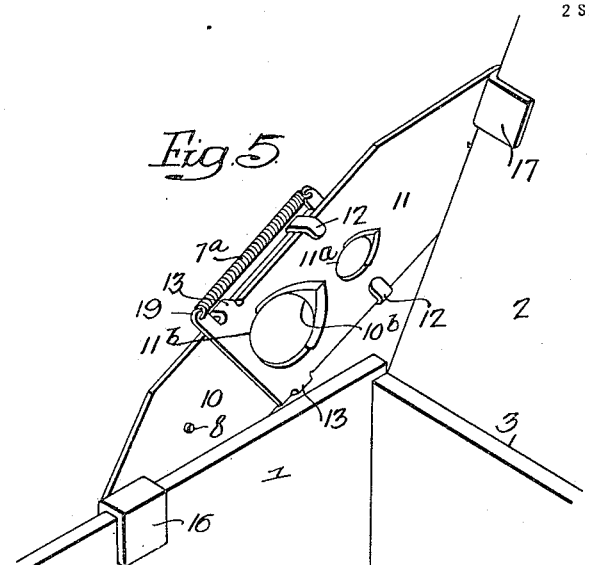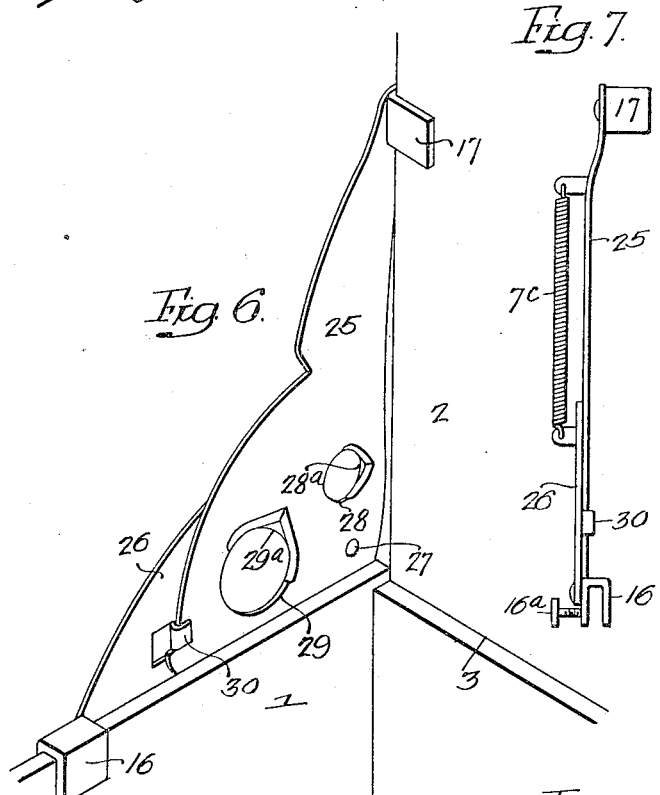

WILLIAM S. LUCKETT, OF PHILADELPHIA, PENNSYLVANIA.

COMBINED CIGAR-CUTTER AND LID-HOLDER.

1,204,289.

Specification of Letters Patent.

Patented Nov. 7, 1916.

Application filed October 10, 1914. Serial No. 866,093.

*To all whom it may concern:*

Be it known that I, WILLIAM STONE LUCKETT, a citizen of the United States, residing in Philadelphia, Pennsylvania, have invented a Combined Cigar-Cutter and Lid-Holder, of which the following is a specification.

My invention relates to cigar box attachments; and the object of my invention is to provide a cigar box; that is to say, an original package containing cigars as sold by the manufacturer or by a dealer over the counter, with means whereby the lid may be held in an elevated position, and to combine with such lid holding device means whereby the tips or ends of the cigars may be cut or clipped in order that they may be smoked; the cutting means being under the control of and operated by the lid of the cigar box.

A further feature of my invention resides in the provision of an enlarged cutting device or a plurality of coöperating cutting elements, one larger than the other, whereby, in addition to cutting the cigar tips, a special form of cigar may be cut into two sections.

These and other features of my invention are more fully described hereinafter, reference being had to the accompanying drawings, in which:

Figure 1, is a perspective view of a cigar box equipped with one form of lid support and cutting device within the scope of my invention; Fig. 2, is a similar view illustrating another form of structure within the scope of my invention; Fig. 3, is a sectional view on the line 3—3, Fig. 2; Figs. 4, 5 and 6, are perspective views similar to Fig. 2, illustrating other forms of box lid supports and cutting devices within the scope of my invention, and Fig. 7, is an edge view of the structure shown in Fig. 6.

In Fig. 1 of the drawings, 1 represents an ordinary cigar box, having a lid 2, hinged thereto as at 3 in the ordinary or usual manner. Suitably secured to one end of the box is a cutting blade 4, which may be of any well-known character, or such blade may be provided with a notched portion 5 with a cutting edge, and carried by the lid of the box is a complemental blade $4^a$ which may be a plain blade, or may be notched, as indicated at $5^a$, for coöperation with the blade 4. The respective blades, whether notched or not, are so positioned that by moving the lid on its hinged connection with the box, said blades will be brought into coöperative relation, so that the tip of a cigar held between the same will be severed when the lid is moved toward the box in the direction of closing the same. By preference, the blade edges are inclined toward each other so that but slight movement of the lid is necessary to effect the cutting action.

In order that the structure may be employed to maintain the lid in a raised or open position and inclined with respect to the box proper, that portion of the knife $4^a$ whereby it is secured to the lid may be provided with an extension or finger 6 adapted to engage the back of the box, as clearly illustrated in Fig. 1, and to insure that the lid will return to the original open position with the knives ready for engagement with the tip of a fresh cigar, I provide a spring 7 suitably connected to the blades and normally holding them in the open position with the lid raised above the box. This spring may be a section of ordinary spring wire curved and fastened at its respective ends to the respective blades. By this means the lid will be held open, permitting free access to the cigars contained within the box, and when the cover, previously lowered to bring the knives into coöperation for the purpose of cutting the ends of the cigars, has been released, it will be immediately restored to the open position.

In the structure shown in Figs. 2 and 3, I provide a pair of slidable members 10 and 11, which are apertured, respectively, at $10^a$ and $11^a$, which members are provided with overlapping clips or projections 12 and 13, respectively, so as to render said members capable of parallel movement with respect to each other. The apertures are provided with suitable cutting edges 14 and 15, and are normally in registry ready to receive the tip of a cigar, which may be severed by effecting sliding movement of the members 10 and 11 whereby the cutting edges of the apertures are carried past each other and effect a cutting action. To limit the movement of said members 10 and 11, they are provided with stop pins 8 for mutual engagement.

In order that the several structures may be employed as box lid supports and be operable by the movement of a lid, I provide clips or ears 16 and 17 carried by the box and lid, respectively, and held in place by thumb-screws $16^a$ and $17^a$, more particularly shown in Figs. 3 and 7, but applicable to and employed with the structures shown in Figs. 2, 4, 5 and 6. This structure will be properly positioned with respect to the box and lid, so that movement of the latter will effect the proper sliding movement of the members 10 and 11 having the coöperating cutting elements to sever the cigar tips; the ends of the members 10 and 11 being pivotally connected to the clips or ears 16 and 17 carried by the box and lid, respectively. To restore this form of the structure to its normal or inactive position ready to receive the tip of a cigar, I provide a spring $7^a$, which may be of the coiled type, having its ends connected to projections 18 and 19 carried respectively by the plates 10 and 11.

In the form of structure shown in Fig. 5, I provide a plurality of coöperating cutting devices; each of the sliding members or elements 10 and 11 having two apertures, $10^a$, $10^b$ and $11^a$, $11^b$, respectively; the apertures $10^b$ and $11^b$ being of materially greater dimensions than the others. The smaller set of cutters is designed for the removal of the end or tip of the cigar to permit the same to be smoked, while the larger apertures $10^b$ and $11^b$ with their coöperating cutting edges are designed for the reception and cutting of the body of a cigar, and have been devised and are more particularly applicable for the cutting into two sections of a special form of cigar. The cutting means carried by the sliding members 10 and 11 are preferably in line, as indicated in the drawings, and these sliding members are secured to a box and its lid in a manner precisely similar to that shown in Fig. 2.

In Figs. 4 and 6, I have shown pivotally connected members provided with coöperating cutting portions. In the structure shown in Fig. 4, is a pair of members 20 and 21 having cutting portions $20^b$ and $21^b$, and provided with offset projections $20^a$ and $21^a$ which are pivotally connected by a pin 22 upon which said members move when the box lid is operated. These members are pivotally attached to clips or ears 16 and 17 carried by the box and lid, respectively, and these cutting members may be held normally separated, ready for use, and in a position that also serves to support the box lid, by means of a curved wire spring $7^b$, of the same character as that shown in Fig. 1.

In the structure shown in Fig. 6, I provide a pair of apertured plates 25 and 26 pivoted at 27, each plate having pairs of apertures 28 and $28^a$ and 29 and $29^a$, respectively, designed for coöperative engagement upon swinging said elements upon their pivotal connection 27. These members will be carried by ears or clips 16 and 17 in a manner precisely similar to the structures shown in Figs. 2, 4 and 5, with a coiled spring $7^c$ designed to normally hold the plates 25 and 26 with their cutting portions in the open or receptive position. In order to maintain said members in operative relation, a clip 30 may be struck up from one of the same and overlie the edge of the other.

I claim:

1. In a combined cigar tip cutter and box lid support, the combination of clips carried by said box and lid, and coöperative cutting members pivotally connected to said clips, said cutting members being movable with respect to each other to effect the cutting action by operating the lid.

2. In a combined cigar tip cutter and box lid support, the combination of clips carried by said box and lid, coöperative cutting members pivotally connected to said clips, said cutting members being movable with respect to each other to effect the cutting action, and means for restoring said cutters to a receptive position, said members in their inactive position serving to hold the box lid open.

3. In a combined cigar tip cutter and box lid support, the combination of clips carried by said box and lid, coöperative members pivotally connected to said clips, and complemental cutting edges carried by said members, the latter being movable with respect to each other to effect the cutting action by operating the lid.

In testimony whereof, I have signed my name to this specification, in the presence of two subscribing witnesses.

W. S. LUCKETT.

Witnesses:
MURRAY C. BOYER,
WM. A. BARR.